United States Patent [19]
Tazaki et al.

[11] 4,026,615
[45] May 31, 1977

[54] CONTAINER FOR MAGNETIC TAPE CASSETTE

[75] Inventors: Teruo Tazaki, Tokyo; Shinichiro Takahashi, Yokohama; Teruyasu Shimozu, Tokyo; Kazumi Fujimoto, Hoya, all of Japan

[73] Assignee: Sony Corporation, Tokyo, Japan

[22] Filed: Mar. 25, 1976

[21] Appl. No.: 670,413

[30] Foreign Application Priority Data

Apr. 1, 1975 Japan .................. 50-44440[U]
Nov. 13, 1975 Japan .................. 50-154548[U]

[52] U.S. Cl. .................. 312/12; 312/20; 312/111; 206/387
[51] Int. Cl.² .................. B65D 85/67; A47B 87/00
[58] Field of Search .............. 312/111, 12, 319, 20, 312/41, 108, 10, 15, 18, 19; 206/387; 220/339

[56] References Cited
UNITED STATES PATENTS

| | | | |
|---|---|---|---|
| 2,087,863 | 7/1937 | Sharp | 312/20 |
| 2,979,370 | 4/1961 | Bradley et al. | 312/319 |
| 3,348,668 | 10/1967 | Amatsu et al. | 312/20 |
| 3,552,817 | 1/1971 | Marcolongo | 312/111 |
| 3,638,788 | 2/1972 | Solomon | 206/387 |
| 3,737,067 | 6/1973 | Palson | 206/387 |
| 3,743,372 | 7/1973 | Ruggerone | 312/111 |
| 3,747,745 | 7/1973 | Esashi et al. | 206/387 |
| 3,871,516 | 3/1975 | Holkestad et al. | 206/387 |
| 3,917,067 | 11/1975 | Brown et al. | 206/387 |

Primary Examiner—Paul R. Gilliam
Assistant Examiner—Victor N. Sakran
Attorney, Agent, or Firm—Lewis H. Eslinger; Alvin Sinderbrand

[57] ABSTRACT

A container for storing a magnetic tape cassette is formed by a one-piece housing, preferably molded of plastic resin and including a substantially rectangular bottom wall having side walls and a back wall directed upwardly along its opposite side and back margins to define a cavity which is open at the top for receiving a cassette and has an opening at the front of the housing through which access may be had to a cassette in the cavity for upwardly dislodging the cassette therefrom, and a top wall or lid hingedly connected, as by a thin cross-section of the plastic, to the top of the back wall for swinging between an upwardly directed opened position and a closed position in which the lid closes the cavity at the top thereof while a flange depending from the front end of the lid closes the opening at the front of the housing. The lid and bottom wall of the housing have mating projections which are frictionally engageable for holding the lid in its closed position and also for preventing rotation of the reels of a cassette stored in the container. Further, the opposite side walls are formed with a groove and rail, respectively, of mating dovetail cross-sections by which a plurality of containers can be secured to each other in side-by-side relation, and the rail preferably terminates short of the front and back ends of the respective side wall and has a medial recess extending along its length for facilitating its engagement in the groove of an adjacent identical container.

16 Claims, 7 Drawing Figures

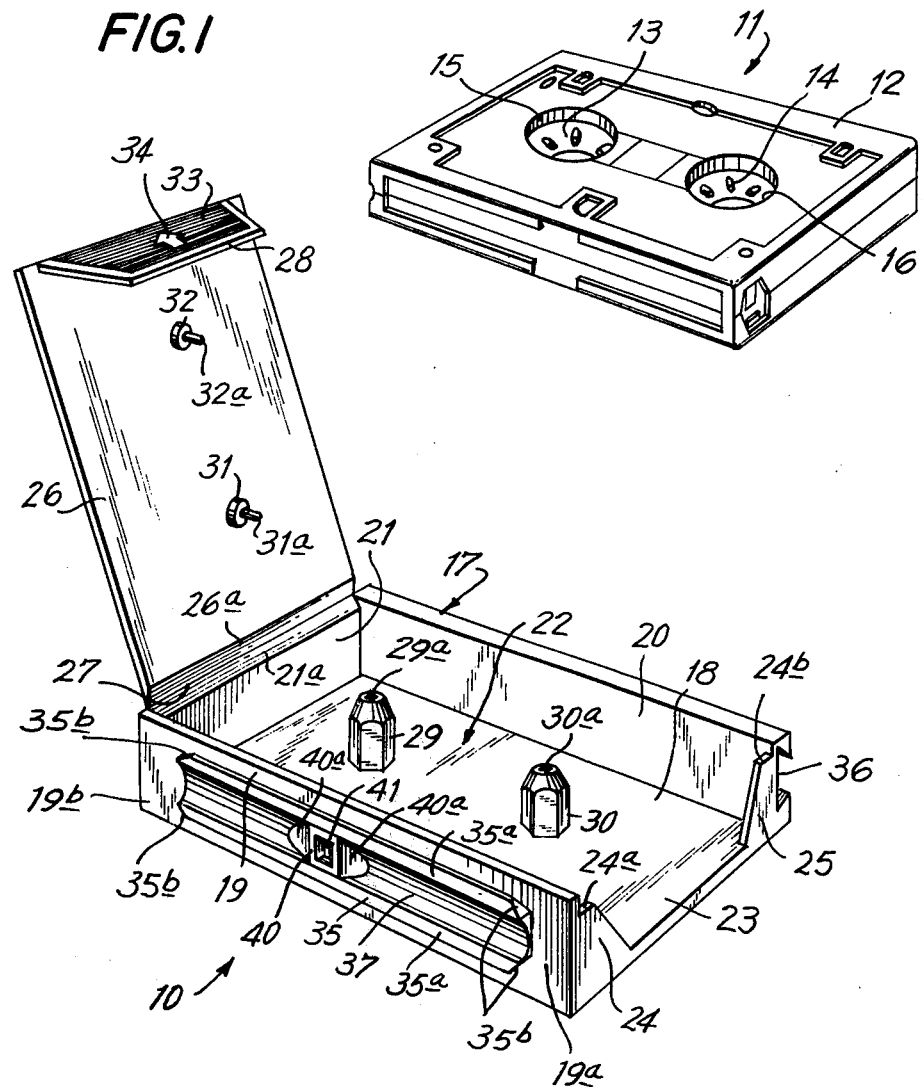
FIG. I

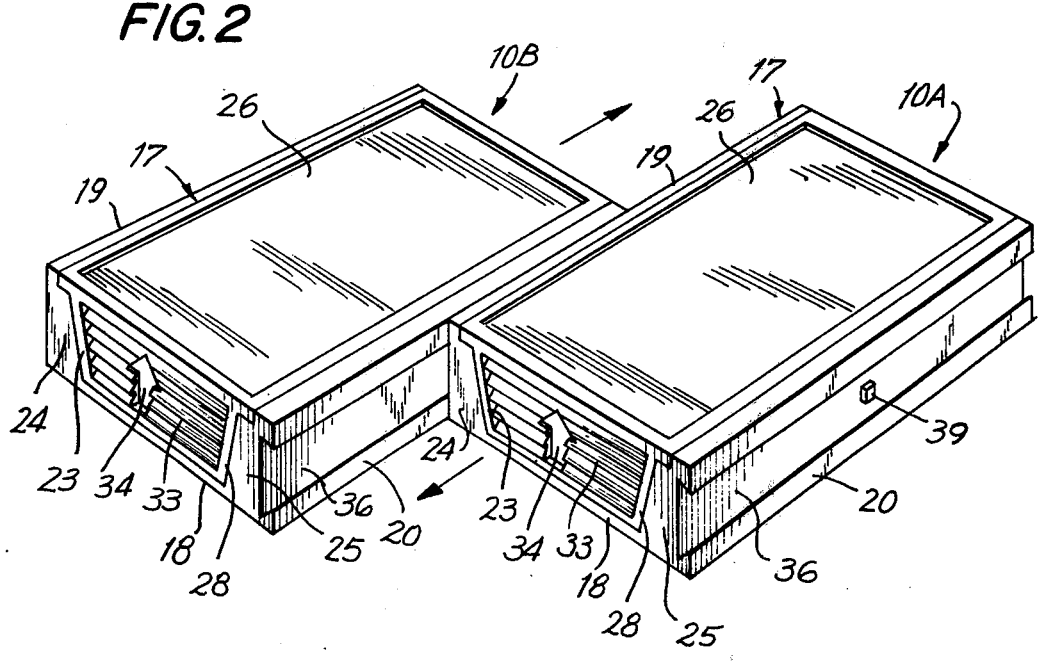
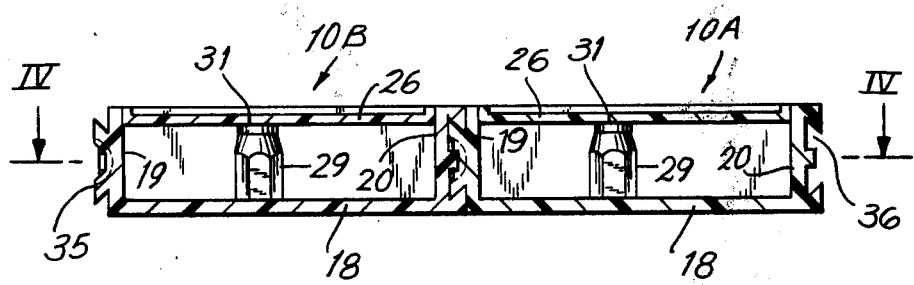

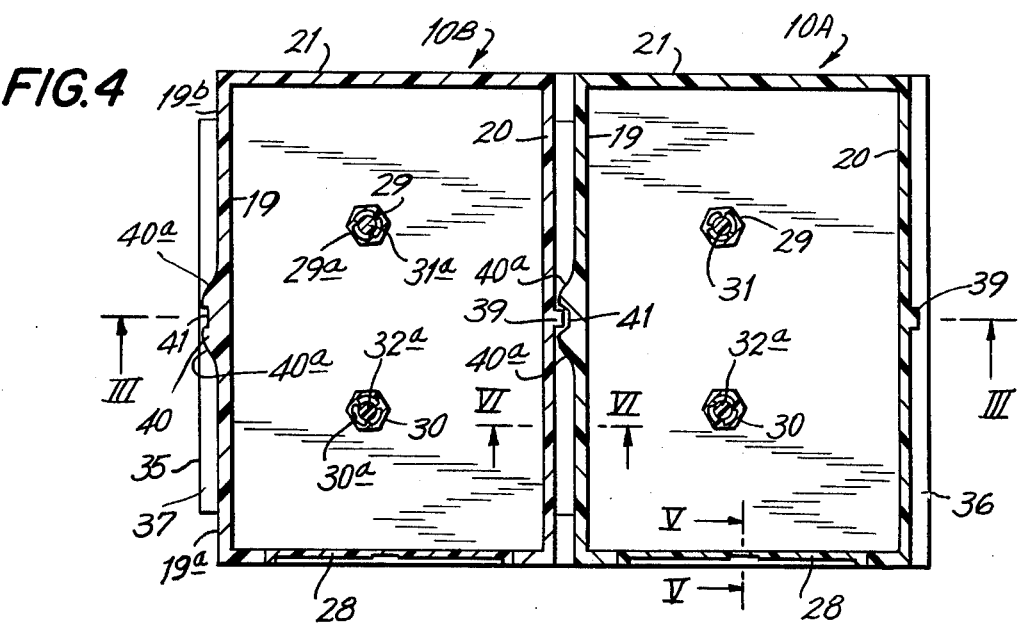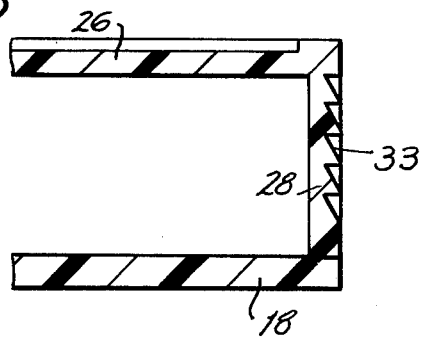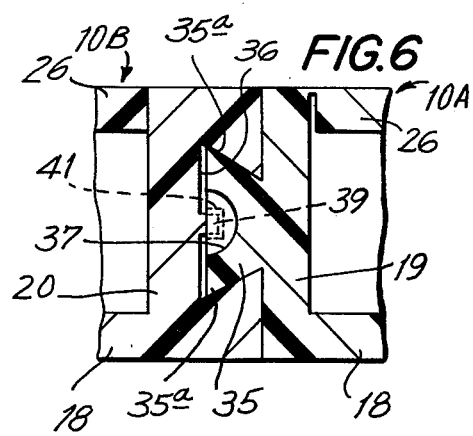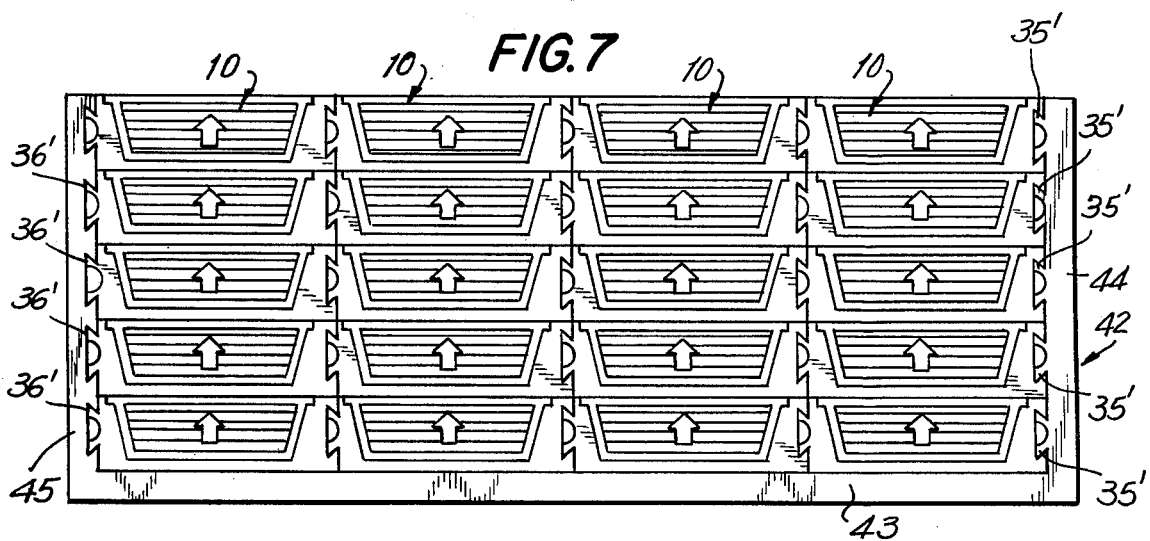

CONTAINER FOR MAGNETIC TAPE CASSETTE

BACKGROUND OF THE INVENTION

1. Field of the Invention

This invention relates generally to a container for storing a magnetic tape cassette, and more particularly is directed to a storage container for a so-called mini-cassette of the type employed in hand-held or pocket-sized tape recorders.

2. Description of the Prior Art

Storage containers have been provided, for example, as disclosed in U.S. Pats. No. 3,899,229, No. 3,904,259 and No. 3,909,088, for standard-size magnetic tape cassettes of the type commonly used in automobile tape decks, and in the tape recording and playback units of stereo systems. Such storage containers for standard-size tape cassettes are of relatively complex construction and formed of a plurality of separately formed parts which are assembled together. However, the existing storage containers are unsuitable, by reason of their complexity and consequent high cost, for mini-cassettes which have come into use with the advent of hand-held or pocket-sized tape recorders.

OBJECTS AND SUMMARY OF THE INVENTION

Accordingly, it is an object of this invention to provide a relatively simple and inexpensive storage container for a magnetic tape cassette, particularly of the mini-cassette type.

Another object is to provide a storage container for a magnetic tape cassette which can be conveniently formed as a one-piece molding of plastic resin.

Still another object is to provide a storage container, as aforesaid, which, when in its closed condition, fully encloses and protects a magnetic tape cassette contained therein, and from which the cassette can be easily removed when the container is in its opened condition.

Still another object is to provide a storage container, as aforesaid, which is effective to prevent rotation of the reels of a tape cassette stored in the container.

A further object is to provide a storage container, as aforesaid, which is formed for secure attachment, in side-by-side relation, to other identical storage containers, with the structure provided for effecting such side-by-side attachment being arranged to facilitate the engagement of the adjacent containers with each other.

In accordance with an aspect of this invention, a container for storing a magnetic tape cassette comprises a one-piece housing, preferably molded of a plastic resin, and including a substantially rectangular bottom wall having side walls and a back wall directed upwardly along its opposite side and back margins to define a cavity which is open at the top for receiving a cassette and has an opening at the front of the housing through which access may be had to a cassette in the cavity for upwardly dislodging the cassette therefrom, and a top wall or lid hingedly connected, as by a thin cross-section of the plastic, to the top of the back wall for swinging between an upwardly directed open position and a closed position in which the lid closes the cavity at the top thereof while a flange depending from the front end of the lid closes the opening at the front of the housing.

It is a feature of this invention to provide the lid and bottom wall of the housing with mating projections which are frictionally engageable with each other for holding the lid in its closed position, and which are also effective to prevent rotation of the reels of a cassette stored in the container.

It is a further feature of this invention to provide the opposite side walls of the housing with a groove and rail, respectively, of mating dovetail cross-sections by which a plurality of the storage containers can be secured to each other in side-by-side relation, with the rail preferably terminating short of the front and back ends of the respective side wall and having a medial recess extending along its length for facilitating the engagement of such rail in the groove of an adjacent identical container.

The above, and other objects, features and advantages of the invention, will be apparent in the following detailed description of an illustrative embodiment thereof which is to be read in connection with the accompanying drawings forming a part hereof.

BRIEF DESCRIPTION OF THE DRAWINGS

FIG. 1 is a perspective view of a container according to an embodiment of this invention which is shown in its opened condition, and of a magnetic tape cassette of the mini-cassette type which is intended to be stored in such container;

FIG. 2 is a perspective view of two storage containers according to this invention which are shown in their closed condition and in the course of being secured to each other in side-by-side relation;

FIG. 3 is a transverse sectional view of two secured-together storage containers according to this invention, and which is taken along the line III—III on FIG. 4;

FIG. 4 is a horizontal sectional view of the two secured-together storage containers taken along the line IV—IV on FIG. 3;

FIG. 5 is an enlarged, fragmentary sectional view taken along the line V—V on FIG. 4;

FIG. 6 is an enlarged, fragmentary sectional view taken along the line VI—VI on FIG. 4; and FIG. 7 is a front elevational view showing several superposed layers of secured together storage containers according to this invention disposed within a storage cabinet.

DESCRIPTION OF A PREFERRED EMBODIMENT

Referring to the drawings in detail, and initially to FIG. 1 thereof, it will be seen that a container 10 according to this invention is intended for the storage therein of a magnetic tape cassette 11 which is preferably of the mini-cassette type, and which is shown to include a generally rectangular cassette housing 12 containing rotatable tape supply and takeup reels having reel hubs 13 and 14 which register with corresponding circular openings 15 and 16 provided in the top and bottom walls of cassette housing 12.

The container 10 according to this invention for storage of the cassette 11 is preferably in the form of a one-piece housing 17 molded of a suitable plastic resin, such as, for example, polypropylene, polyvinylchloride, polyethylene and the like. Such one-piece housing 17 is shown to include a substantially rectangular bottom wall 18 having side walls 19 and 20 and a back wall 21 directed upwardly along the opposite side and back margins, respectively, of bottom wall 18. Walls 18–21 define a cavity 22 which is dimensioned suitably and open at the top for receiving the cassette 11, and which has an opening 23 at the front of housing 17 through which access may be had, as with a finger, to the cassette 11 in cavity 22 for upwardly dislodging the cassette therefrom. The housing 17 further preferably has inwardly directed wall sections 24 and 25 extending from the front ends of side walls 19 and 20, respectively, and delimiting the opening 23 at the front of the housing so as to prevent the forward discharge of the cassette 11 from cavity 22 through the front opening 23. As shown, the inner edges of wall sections 24 and 25 desirably converge downwardly, while the top edges 24a and 24b of wall sections 24 and 25 are desirably offset downwardly by a relatively small distance from the top edges of the adjacent side walls 19 and 20.

The one-piece housing of storage container 10 according to this invention is further shown to include a top wall or lid 26 which is hingedly connected, at one end, to the top of back wall 21 for swinging between an upwardly directed opened position (FIG. 1) and a closed position (FIG. 2) in which top wall or lid 26 extends between the upper edge portions of side walls 19 and 20 to close the cavity 22 at the top of the latter. In order to provide the desired integral, hinged connection between top wall or lid 26 and back wall 21, the upper edge 21a of back wall 21 and the adjacent end edge 26a of lid 26 are preferably oppositely bevelled, as shown on FIG. 1, and connected by a thin, and therefore flexible web or cross-section 27 of the plastic resin which forms the actual hinge. The top wall or lid 26 is preferably laterally dimensioned so as to fit closely between side walls 19 and 20 in the closed position of the lid (FIG. 2), while the longitudinal dimension of lid 26 is selected so that, in such closed position of the lid, the forward end of the latter, that is, the end remote from hinge 27, will seat on the upper edges 24a and 24b of wall sections 24 and 25 at the front of the housing. Further, as shown, the end of top wall or lid 26 remote from hinge 27 has a flange 28 with suitably converging side edges extending at right angles therefrom so that, when top wall or lid 26 is in its closed position, flange 28 depending therefrom will fit closely in, and hence close the front opening 23 of housing 17.

In order to releasably hold top wall or lid 26 in its closed position, storage container 10 according to this invention is further shown to have projections 29 and 30 formed integral with bottom wall 23 and directed upwardly from the latter at suitably spaced locations so as to extend into reel hubs 13 and 14 of a cassette 11 when the latter is disposed in cavity 22.

Projections 31 and 32 are mated or paired with the projections 29 and 30, respectively, and extending integrally from top wall or lid 26 so as to frictionally engage with the respective projections 29 and 30 in the closed position of the top wall or lid. In the embodiment shown on the drawings, the projections 29 and 30 are female members defining upwardly opening sockets 29a and 30a with circumferentially spaced, axial ribs therein (FIG. 4), while the projections 31 and 32 are male members having stems 31a and 32a which are respectively frictionally engageable with the ribs in sockets 29a and 30a. Further, the female projections 29 and 30 preferably have non-cylindrical outer surfaces, for example, hexagonal outer surfaces, as illustrated, which, when inserted in the reel hubs 13 and 14 of the cassette 11 disposed in cavity 22, are effective to engage the usual coupling pins or the like formed in such reel hubs for preventing rotation of the supply and takeup reels of the stored cassette.

As shown particularly on FIGS. 1,2 and 5, the flange 28 at the front end of top wall or lid 26 preferably has laterally extending ridges or serrations 33 formed on its outer surface so that such ribbed or serrated outer surface may be conveniently gripped when it is desired to swing lid 26 from its closed position to its opened position. The outer surface of flange 28 further preferably has an upwardly directed arrow 34 embossed or otherwise formed thereon so as to indicate the direction in which flange 28 is to be displaced for moving lid 26 to its opened position.

As shown particularly on FIGS. 2, 3 and 4, a plurality of the storage containers according to this invention, for example, the storage containers 10A and 10B, are adapted to be secured to each other in side-by-side relation so that, when thus secured to each other, the top walls or lids 26 of the storage containers may be opened and closed independently of each other. In order to provide for securing together of the storage containers in side-by-side relation, the outer surfaces of the opposite side walls 19 and 20 of each container housing 17 are formed with a rail 35 and a groove 36, respectively, of mating dovetail cross-sections extending longitudinally along the respective side walls (FIGS. 1–4, and 6). In order to facilitate the engagement of the rail 35 of each storage container in a groove 36 of another storage container, each rail 35 preferably has a length substantially smaller than the length of the respective side wall 19 so that, for example, as shown particularly on FIG. 1, the ends of each rail 35 terminate short of the front and back ends of the respective side wall 19. Thus, the side wall 19 of each storage container has flat front and back end portions 19a and 19b leading to the adjacent ends of the respective rail 35. By reason of the foregoing, when securing together two storage containers according to this invention, for example, the containers 10A and 10B in FIG. 2, such containers are initially positioned laterally side-by-side, but with the container 10B substantially ahead of the container 10A so that the flat front end portion 19a of side-wall 19 of container 10A will abut facially against the back end portion of side wall 20 of container 10B. After such initial positioning of containers 10A and 10B, container 10A is moved forwardly relative to container 10B so as to cause rail 35 of container 10A to enter the back end of groove 36 of container 10B and to slide longitudinally along such groove. Of course, container 10A may be initially disposed in advance of container 10B and then moved rearwardly with respect to the latter so that, in such case, rail 35 of container 10A enters groove 36 of container 10B at the front end of the latter. In order to facilitate the entry of rail 35 of each storage container into the groove 36 of a next adjacent storage container as aforesaid, the opposed edges 35a of the rail 35 preferably have bevelled ends, as indicated at 35b on FIG. 1.

As previously indicated, rail 35 and groove 36 of each storage container have mating dovetail cross-sections so that the rail 35 of one storage container will fit relatively tightly in the groove 36 of a next adjacent storage container and thereby ensure that the engaged storage containers will be firmly secured to each other. However, if the rail 35 was formed with a solid cross-section, the close fitting of such rail in the groove 36 of an adjacent storage container would make it difficult to slide the rail 35 along the groove 36 when engaging or disengaging the adjacent storage containers. In order to avoid the foregoing problem, in the storage container according to this invention, the rail 35 is formed with a medial recess 37 (FIGS. 1 and 6), for example, of semicircular cross-section, extending along the rail 35 so that the opposed edge portions 35a of the rail can be flexed toward each other for facilitating the movement of the rail 35 along the groove 36 of the next adjacent container.

Although it is desirable that the rail 35 of a storage container be relatively freely slidable along the groove 36 of another container when securing together the two containers in side-by-side relation, or when separating such containers, it is also desirable that relative longitudinal movement of the secured together containers be relatively strongly resisted when such containers are in lateral alignment, that is, aligned with each other in the forward and backward directions, as shown on FIG. 4. In order to relatively strongly resist displacement of the secured together containers from the condition of lateral alignment, a node or projection 39 is located centrally in the groove 36 (FIGS. 2 and 4), and a land 40 (FIGS. 1 and 4) is formed centrally in the recess 37 of rail 35 with a socket 41 being provided in such land 40. Further, inclined ramps 40a lead to and from land 40 in recess 37. Thus, when the two storage containers 10A and 10B are being secured together in side-by-side relation, as described above with reference to FIG. 2, the node or projection 39 in the groove 36 of container 10B moves without resistance along recess 37 of rail 35 on container 10A until the containers 10A and 10B near their relative positions of lateral alignment, whereupon the node or projection 39 moves along an inclined ramp 40a leading to land 40 and snaps into the respective socket 41 for holding containers 10A and 10B in lateral alignment with each other. When it is desired to separate the containers 10A and 10B, such containers are initially relatively forcefully displaced in the longitudinal direction with respect to each other so as to move the node or projection 39 of container 10B out of the sodket 41 of container 10A, whereupon, such node or projection 39 again moves freely along the recess 37 of rail 35 so that the storage containers can be relatively longitudinally displaced without undue resistance thereto.

Although the securing together of two storage containers 10A and 10B according to this invention has been described above, it will be apparent that any desired number of such storage containers may be secured together in a laterally extending row for ease in handling or storing such containers either with or without cassettes being stored therein. For example, as shown on FIG. 7, for the purposes of storing, shipping and point of sale display of the storage containers 10 according to this invention, four of such storage containers may be secured together in side-by-side relation to form a row or layer of storage containers 10, whereupon a number of such rows or layers of storage containers are superposed on each other in a shipping, storing or display cabinet 42. Such display cabinet 42 may include a bottom wall 43 and upwardly directed side walls 44 and 45 to embrace the superposed rows or layers of storage containers 10. Further, if desired, the inner surface of side wall 45 of the cabinet may be formed with vertically spaced apart grooves 36' of dovetail cross-section which are each similar to the groove 36 of each storage container 10, while the inner surface of the opposite cabinet side wall 44 is formed with vertically spaced apart rails 35' of dovetail cross-section which are each similar to the rail 35 of each storage container 10. The rails 35' and grooves 36' of cabinet 42 are located for engagement with the grooves 36 and rails 35, respectively, of the storage containers 10 at the adjacent ends of the superposed layers or rows of secured together storage containers. Thus, the several storage containers 10 according to the invention will be securely and safely held within cabinet 42 while being removable from the latter by longitudinal displacement of each storage container 10, or of a row or layer of such storage containers, relative to the cabinet 42.

Although a storage container for a magnetic tape cassette according to a particular embodiment of this invention has been specifically described herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A container for storing a magnetic tape cassette comprising a one-piece housing including a substantially rectangular bottom wall, and side walls and a back wall directed upwardly along the opposite side and back margins, respectively, of said bottom wall to define a cavity which is open at the top for receiving a cassette and has an opening at the front of the housing extending substantially down to said bottom wall and through which access may be had to a cassette in the cavity for upwardly dislodging the cassette therefrom, and a top wall hingedly connected, at one end, to the top of said back wall for swinging between an upwardly directed opened position and a closed position in which said top wall extends between said side walls to close said cavity at the top of the latter, said top wall having a depending flange at the end thereof remote from its hinged connection to said back wall for closing said opening at the front of the housing in said closed position of the top wall; and means engageable in said closed position of the top wall for releasably holding the latter in said closed position.

2. A container according to claim 1; in which said housing and said means for releasably holding the top wall in its closed position are a unitary molding of plastic resin.

3. A container according to claim 1; in which said housing further has inwardly directed wall sections extending from the front ends of said side walls and delimiting said opening so as to prevent the forward discharge of a cassette from said cavity when said top wall is in its opened position.

4. A container according to claim 1; in which said means for releasably holding the top wall in said closed position includes pairs of projections extending from said bottom wall and top wall, respectively, and being frictionally engageable with each other in said closed position of the top wall.

5. A container according to claim 4; in which there are two of said pairs of projections located to extend through respective reel hubs of a cassette disposed in said cavity.

6. A container according to claim 5; in which each of said pairs of projections includes a female member defining an axially open socket and having a non-circular periphery for holding the respective reel hub of a cassette against rotation, and a male member which is frictionally engageable in said socket of the respective female member.

7. A container according to claim 1; in which one of said side walls has a groove of dovetail cross-section extending along its outer surface, and the other of said side walls has an elongated rail extending along its outer surface and having a dovetail cross-section similar to that of said groove so that a plurality of containers can be secured in side-by-side relation with said groove of one container slidably receiving said rail of the next adjacent container.

8. A container according to claim 7; in which said rail has a medial recess extending therealong so that the opposed edges of said rail can be flexed toward each other for facilitating the movement of said rail along the groove of a next adjacent container.

9. A container according to claim 8; in which said rail terminates short of the front and back ends of the respective side wall.

10. A container according to claim 9; in which said opposed edges of the rail have bevelled ends.

11. A container according to claim 7; in which said rail terminates short of the front and back ends of the respective side wall.

12. A container according to claim 7; in which the opposed edges of said rail have bevelled ends.

13. A container according to claim 7; in which said groove has a centrally located node therein, said rail has a medial recess extending therealong in which said node of a next adjacent container can travel when securing together a plurality of the containers, and a land is formed centrally in said recess with a socket in said land to receive said node of said next adjacent container for forward and backward alignment of the secured together containers.

14. A one-piece molded plastic container for a magnetic tape cassette comprising a rectangular housing having opposed side walls, one of said side walls having opposed side walls, one of said side walls having a groove of dovetail cross-section extending along its outer surface, the other of said side walls having an elongated rail extending along its outer surface, said rail having a dovetail cross-section that is complementary to said cross-section of the groove, said rail terminating short of the opposed ends of said other side wall so that, when a plurality of the containers are to be secured together in side-by-side relation, said one side wall of one container can be disposed against an end portion of said other side wall of another container, whereupon the containers can be longitudinally moved relative to each other to longitudinally slidably engage their respective rail and groove, and said rail having a medial recess extending therealong so that the opposed edges of said rail can be flexed toward each other for facilitating the movement of said rail along the groove of a next adjacent container.

15. A container according to claim 14; in which said groove has a centrally located node therein which can travel along said medial recess of the rail of a next adjacent container, and said recess has a central land therein formed with a socket for receiving said node of a next adjacent container for aligning secured together containers in the direction along their respective grooves and rails.

16. A container according to claim 14; in which the edges of said rail are bevelled at the opposite ends of the latter for facilitating the entry of said rail into said groove of a next adjacent container.

* * * * *